(12) United States Patent
Borzabadi et al.

(10) Patent No.: US 6,993,975 B2
(45) Date of Patent: Feb. 7, 2006

(54) PRESSURE SENSOR MODULE HAVING STRESS ISOLATION PLATFORM

(75) Inventors: Hamid R. Borzabadi, Noblesville, IN (US); Dennis M. Koglin, Carmel, IN (US); Gregory J. Manlove, Kokomo, IN (US); Stephen P. Long, Tipton, IN (US)

(73) Assignee: Delphi Technologies, Inc., Troy, MI (US)

( * ) Notice: Subject to any disclaimer, the term of this patent is extended or adjusted under 35 U.S.C. 154(b) by 34 days.

(21) Appl. No.: 10/699,752

(22) Filed: Nov. 3, 2003

(65) Prior Publication Data

US 2005/0092095 A1 May 5, 2005

(51) Int. Cl.
*G01L 9/00* (2006.01)

(52) U.S. Cl. ........................................... 73/754
(58) Field of Classification Search .................. 73/754, 73/756, 726, 700, 862.59
See application file for complete search history.

(56) References Cited

U.S. PATENT DOCUMENTS

| 5,740,594 A | | 4/1998 | Lukasiewicz et al. |
| 5,808,210 A | * | 9/1998 | Herb et al. ............. 73/862.59 |
| 5,955,678 A | * | 9/1999 | Chapman et al. ............ 73/756 |
| 6,092,425 A | * | 7/2000 | Kuznia et al. ................ 73/726 |

FOREIGN PATENT DOCUMENTS

| DE | 43 42 665 | 6/1995 |
| EP | 0 263 190 | 4/1988 |

* cited by examiner

*Primary Examiner*—William Oen
*Assistant Examiner*—Andre Allen
(74) *Attorney, Agent, or Firm*—Stefan V. Chmielewski

(57) ABSTRACT

A pressure sensor module is provided with an isolation platform which isolates stress. The pressure sensor module includes a base structure and a cantilever member formed in the base structure by an isolation gap. A pressure sensing element is located on the cantilever member such that the cantilever member provides stress isolation to the pressure sensing element.

9 Claims, 3 Drawing Sheets

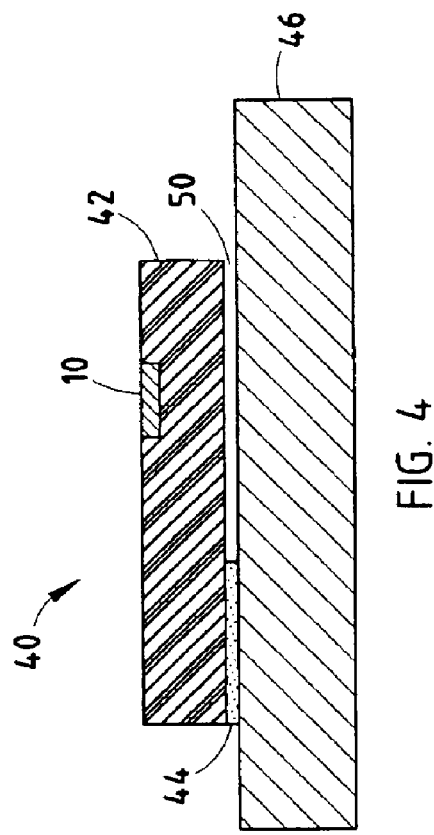
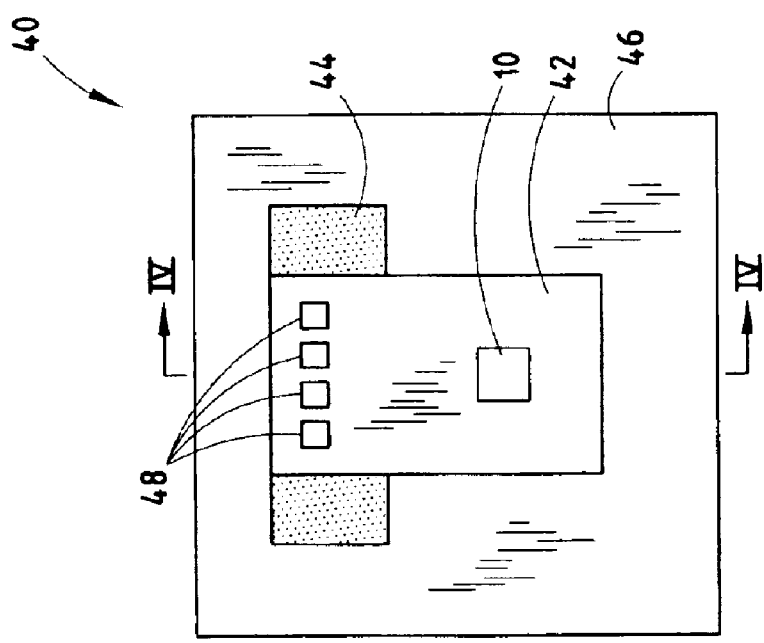

PRESSURE SENSOR MODULE HAVING STRESS ISOLATION PLATFORM

TECHNICAL FIELD

The present invention generally relates to pressure sensing and, more particularly, relates to a pressure sensor module that realizes minimal package stress.

BACKGROUND OF THE INVENTION

Pressure sensors are commonly employed in automotive vehicle applications to control and monitor various aspects of vehicle operation. The pressure sensors are typically required to provide an accurate analog voltage output representative of the pressure applied to a sensing element. In automotive applications, the pressure sensor is generally required to be accurate over a large temperature range of approximately −40° to +125° C. throughout the life of the vehicle.

A typical pressure sensor is shown in FIGS. 1 and 2 including two components, namely a pressure sensing element shown in FIG. 1 and a compensation circuit shown in FIG. 2. The pressure sensing element 10 shown and described herein is a piezo-resistance sensor having four resistors R1–R4 configured in a Wheatestone Bridge. Input terminals 16 and 18 are coupled to voltage supply $V_s$ and ground, respectively. Resistors R1 and R3 decrease in magnitude proportional to the applied pressure, and resistors R2 and R4 increase in magnitude proportional to the applied pressure. An increase in sensed pressure causes an increase in the voltage $V_o+$ on terminal 14, and a decrease in the voltage $V_o-$ on terminal 12, thus producing a differential output voltage $V_o+$ minus $V_o-$ that is proportional to the pressure applied to the sensing element 10. Pressure sensing elements have alternately been configured to include a variable capacitance type element.

The compensation circuit 20 shown in FIG. 2 can be a separate integrated circuit (IC) or may be integrated with the pressure sensing element 10 or other circuitry. The compensation circuit 20 receives the differential voltage inputs $V_o+$ and $V_o-$ at terminals 14 and 12, respectively, and applies a differential voltage to a voltage-to-current converter and multiplier 22. In addition to converting the differential voltage to a current signal, the multiplier compensates for gain at room temperature and temperature dependent gain. This is achieved by controlling current sources $I_A$ and $I_B$ via a programmed function, such as lookup table 24. The temperature compensated current signal is then applied to a negative terminal of an amplifier 28.

The compensation circuit 20 also has a current source $I_S$ applied to the negative terminal of the amplifier 28. The current source $I_S$ compensates for sensor offsets at room temperature and temperature dependent sensor offsets. This is achieved by controlling current source $I_S$ via a programmed function, such as lookup table 26.

The resultant current is converted to an output voltage $V_{OUT}$ across the amplifier 28 and feedback resistor $R_{FB}$. The resistor $R_{LD}$ applies current to place the output at a desired direct current (DC) offset. The resultant output voltage $V_{OUT}$ at output terminal 30 is the desired compensated output signal ranging in value between ground and supply voltage $V_{DD}$. The output voltage $V_{OUT}$ is proportional to the pressure applied as an input to the sensing element 10. Linear errors in gain, offset, and temperature dependency are thus compensated with the compensation circuit 20.

With many pressure sensors, the sensing element is packaged in a module that is easily susceptible to module package stress. Such module package stress generally causes a differential voltage from the pressure sensor to produce non-linear temperature effects. The resultant stresses on the module exhibited with conventional pressure sensing modules typically change over the life of the sensor package and cause the output voltage $V_{OUT}$ signal to drift over time. The aforementioned non-linear temperature effects and the long-term drift generally cannot be easily calibrated out of the sensor arrangement, and thus will generally cause errors in the sensor output. These resultant errors limit the accuracy of the pressure sensor and complicate the sensor module design.

It is therefore desirable to provide for a pressure sensor module that experiences reduced or minimal package stress. It is further desirable to provide for such a pressure sensor module that experiences reduced or minimal non-linear temperature effects and sensor signal drift.

SUMMARY OF THE INVENTION

In accordance with the teachings of the present invention, a pressure sensor module is provided which offer isolation to reduce or minimize stress. The pressure sensor module includes a base structure and a cantilever member formed in the base structure. The pressure sensor module also includes a pressure sensing element located on the cantilever member. The cantilever member serves as a stress isolated platform.

According to another aspect of the present invention, the base structure includes a first member connected to a second member. The cantilever member is formed by an isolation gap formed between the first and second members. According to a further aspect of the present invention, the cantilever member is formed by an isolation gap extending into an underlying housing. By arranging the pressure sensing element on the cantilever member, the sensor element is less susceptible to package stress.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which:

FIG. 3 is a top view of a pressure sensing module employing a stress isolated platform according to a first embodiment of the present invention;

FIG. 4 is a cross-sectional view of the pressure sensing module taken through lines IV—IV of FIG. 3;

DESCRIPTION OF THE PREFERRED EMBODIMENTS

Figures 1, 2:
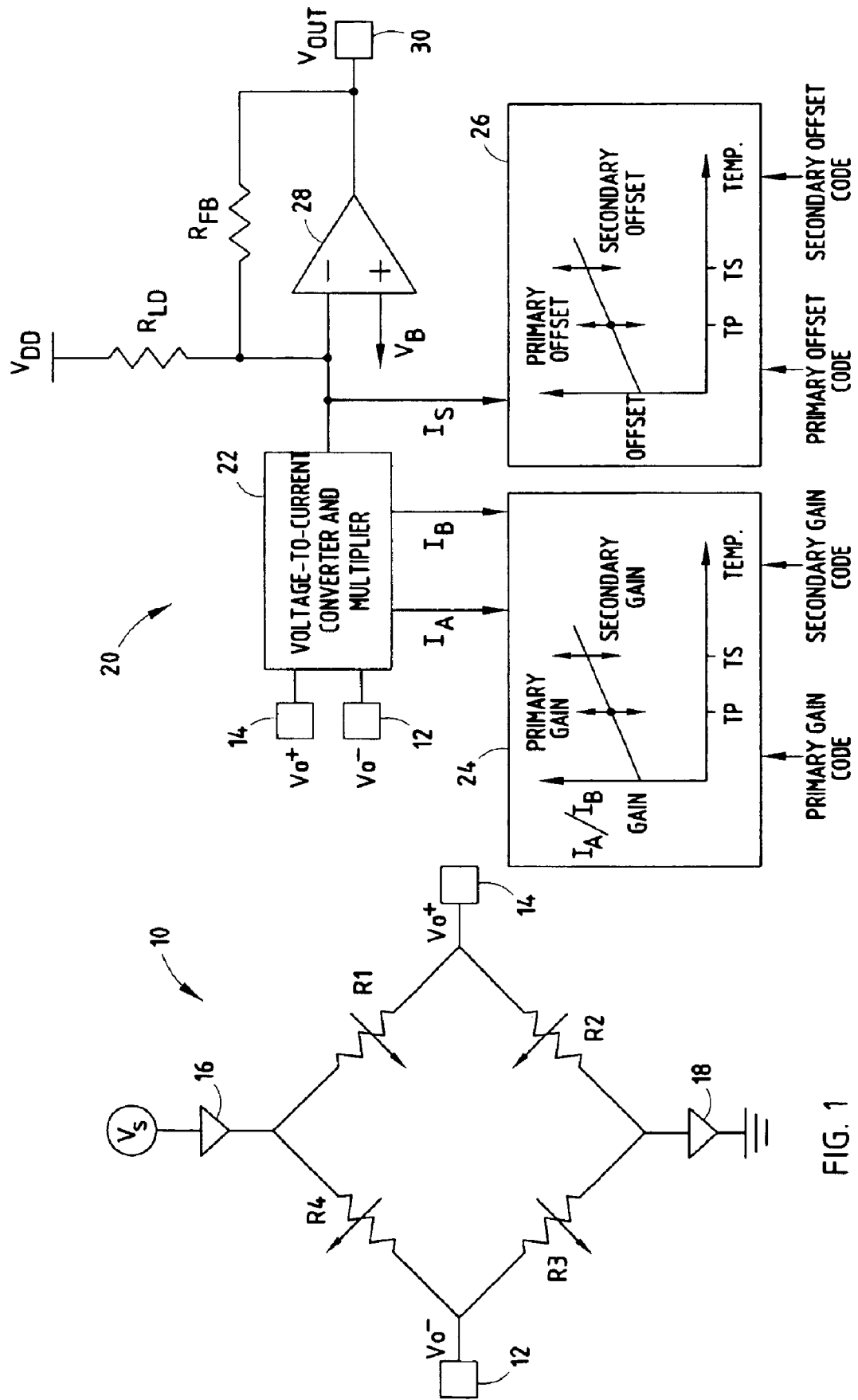
FIG. 1 is a circuit diagram illustrating a piezo-resistive pressure sensing element configured as a Wheatestone Bridge.
FIG. 2 is a compensation circuit for processing the sensed pressure signal.

A pressure sensing module is shown and described herein having a pressure sensing element mounted on a cantilever member supported on a base structure according to the present invention. The arrangement of the pressure sensing element on the cantilever member reduces stress and improves the performance of the pressure sensor in a cost-effective manner. By reducing package stress, enhanced accuracy calibration of the pressure sensor may be achieved by eliminating non-linearities. The pressure sensor module is shown and described herein according to first and second embodiments, but is not intended to be limited to the specific embodiments shown.

Referring to FIGS. 3 and 4, a pressure sensor module 40 is illustrated according to a first embodiment of the present invention. The pressure sensor module 40 includes a pressure sensing element 10 mounted on a sensor cell 42. The sensor cell 42 is a supporting base member that may be made of silicon and supports the sensing element 10 and electrical circuitry including electrical contact pads 48. The sensor cell 42, in turn, is adhered onto the upper surface of an underlying substrate 46 via an adhesive 44.

Adhesive 44 is applied to fill in only a portion of the region between the bottom surface of sensor cell 42 and upper surface of substrate 46. In particular, the application of adhesive 44 is limited to an inactive sensing region of sensor cell 42 so as to create an isolation gap 50 between a portion of sensor cell 42 and substrate 46. The isolation gap 50 results in the formation of a cantilever member formed by the portion of sensor cell 42 including the sensing element 10 extending over isolation gap 50.

The pressure sensing element 10 is arranged on the sensor cell 42 in a region on or over the isolation gap 50 and, thus, is arranged on the cantilever member. By arranging the sensing element 10 on the cantilever member, the amount of stress realized by the pressure sensor module 40 is advantageously minimized with the present invention. By minimizing the resultant stress that is experienced, the pressure sensor module 40 achieves enhanced pressure sensing accuracy.

The pressure sensing element 10 may include any of a number of pressure sensing elements, such as piezo-resistive elements and variable capacitance type sensors. The pressure sensing element 10 has contact terminals which, in turn, are electrically coupled to contact pads 48 formed on the upper surface of the sensor cell 42. The contact terminals 48 may in turn be electrically coupled to a compensation circuit which may be integrated with or separate from an electronic control module for further processing the output signal generated with the pressure sensor.

Figure 6:
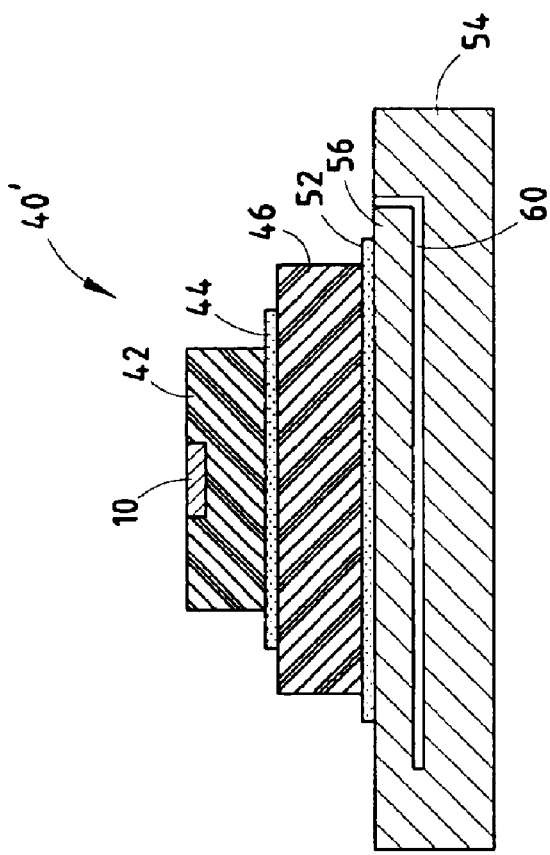
FIG. 6 is a cross-sectional view of the pressure sensing module taken through lines VI—VI of FIG. 5.
Figure 5:
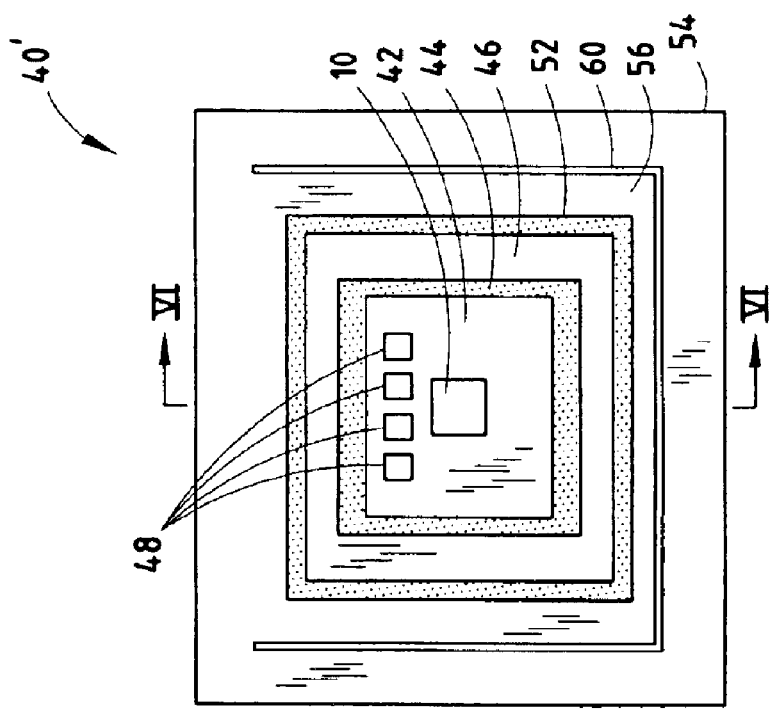
FIG. 5 is a top view of a pressure sensing module employing a stress isolated platform according to a second embodiment of the present invention.

Referring to FIGS. 5 and 6, a pressure sensing module 40' is illustrated according to a second embodiment of the present invention. The pressure sensing element 40' includes a pressure sensing element 10 mounted on a sensor cell 42. The sensor cell 42, in turn, is adhered on its lower surface to an upper surface of an underlying substrate 46. In contrast to the first embodiment, sensor cell 42 and substrate 46 are adhered together via a substantially continuous layer of adhesive 44 so as not to form a gap therebetween. The substrate 46, in turn, is adhered on its lower surface to an upper surface of a housing 54 via adhesive layer 52. Housing 54 may include a ceramic material, such as low temperature co-fired ceramic (LTCC) made from multiple thin layers of ceramic. Together, the sensor cell 42, substrate 46, and housing 54 form a base structure.

The pressure sensing module 40' includes the presence of a cantilever member formed in the housing 54 which, in turn, supports the substrate 46 and sensor cell 42 containing the pressure sensing element 10. The cantilever member is labeled as member 56 of housing 54 formed by an isolation gap 60 extending into housing 54. The isolation gap 60 may be formed by cutting, etching, or otherwise forming a slot, channel, or other opening into housing 54 from the upper surface vertically downward and then orthogonal thereto, as shown. Alternately, the isolation gap 60 may be formed extending from one side edge extending into but not completely through to the opposite side edge. The isolation gap 60 may be formed in housing 54 during formation of housing 54 by patterning layers to add channels and cavities in the final substrate material of housing 54. The ceramic layers may then be sandwiched together and then co-fired to create the final substrate including the isolation gap 60. Alternately, it should be appreciated that the isolation gap 60 may be formed by etching, cutting, or other known removal techniques for forming a slot, channel, or other opening to provide the isolation gap and cantilever member.

According to this arrangement of pressure sensor module 40', the pressure sensing element 10 is supported on a base structure made up of sensor cell 42, substrate 46, and cantilever member 56 of housing 54 so as to realize reduced package stress. The pressure sensing element 10 includes electrical terminals electrically coupled to contact pads 48. Contact pads 48 in turn may be electrically coupled to compensation circuitry which may be integrated with or separate from an electronic control module which further processes the output signal generated with the pressure sensor.

The pressure sensing modules 40 and 40' employing the cantilever arrangement of the present invention achieve significantly lower stress levels in the active region of the pressure sensor element 10. It is further possible to control the amount of cantilever stress reduction in the pressure sensor and substrate to achieve certain resulting characteristics. It should be appreciated that the sensing element 10 may be formed in various types of sensor cells and the cantilever member may be formed in any of a number of base structure members including, but not limited, the sensor cell 42 itself, the substrate 46, the housing 54, or any intermediary layers.

Accordingly, the pressure sensing modules 40 and 40' of the present invention advantageously reduce the amount of stress that is experienced and improve the performance of the pressure sensor in a cost-effective manner. The reduction of the stress achieved with the present invention allows for enhanced accuracy calibration of the pressure sensor by eliminating or reducing non-linearities. The elimination or reduction of non-linearities produces a more accurate pressure sensor that can be reliably manufactured. Additionally, by sufficiently isolating the stress, it is possible to calibrate sensing circuits in bulk, and singulate the sensor module packages. Testing in bulk is highly desirable, because the manufacturing costs of the pressure sensor can be significantly reduced.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

What is claimed is:

1. A pressure sensor module comprising:

a base structure; and a pressure sensor adhered to the base structure via an adhesive layer, said pressure sensor comprising a pressure sensing element, wherein the adhesive layer adheres only a first portion of the pressure sensor to the base structure to create an isolation gap between a second portion of the sensor and the base structure, wherein the isolation gap forms a cantilever member via the second portion of the sensor that provides stress isolation to the pressure sensing element.

2. The pressure sensor module as defined in claim 1, wherein the sensor comprises a sensor cell further comprising electrical circuitry.

3. The pressure sensor module as defined in claim 1, wherein the base structure comprises a substrate.

4. A pressure sensor module comprising:
   a base structure comprising a first member and a second member fixed to the first member;
   an adhesive layer adhering only a first portion of the first member to the second member to create an isolation gap between a second portion of the first member and the second members, wherein a cantilever member is formed via the second portion of the first member by the isolation gap; and
   a pressure sensing element located on the cantilever member, wherein the cantilever member provides stress isolation to the pressure sensing element.

5. The pressure sensor module as defined in claim 4, wherein the first member comprises a sensor cell comprising electrical circuitry and connected to the second member, wherein the pressure sensing element is located on the sensor cell.

6. The pressure sensor module as defined in claim 4, wherein the base structure further comprises a housing connected to the second member.

7. A method of forming a stress isolated pressure sensor module comprising the steps of:
   providing a base structure;
   applying an adhesive layer to a portion of the base structure; and
   adhering a pressure sensor comprising a pressure sensing element onto the base structure via the adhesive layer, wherein the pressure sensor is adhered onto a portion of the base structure to create an isolation gap between a remaining portion of the pressure sensor, wherein the cantilever member is formed by the isolation gap so that the cantilever member provides stress isolation to the pressure sensing element.

8. The method as defined in claim 7, wherein the step of providing a base structure comprises forming a first member on top of a second member, wherein the pressure sensing element is disposed on the first member.

9. The method as defined in claim 8, wherein the first member is adhered to only a portion of the second member such that the isolation gap is formed between the first and second members and the first member forms the cantilever member.

* * * * *